United States Patent [19]

Naylor

[11] 3,931,126

[45] Jan. 6, 1976

[54] MODIFICATION OF CONJUGATED DIENE POLYMERS BY TREATMENT WITH ORGANOLITHIUM AND N,N,N′,N′-TETRAMETHYLALKYLENEDIAMINE COMPOUNDS

[75] Inventor: Floyd E. Naylor, Bartlesville, Okla.

[73] Assignee: Phillips Petroleum Company, Bartlesville, Okla.

[22] Filed: Oct. 4, 1967

[21] Appl. No.: 672,692

[52] U.S. Cl. .......... 260/83.7; 260/85.1; 260/94.2 M; 260/94.7 N
[51] Int. Cl.$^2$ .......................................... C08C 19/22
[58] Field of Search ......... 260/85.1, 94.7 N, 94.2 M

[56] References Cited
UNITED STATES PATENTS

| | | | |
|---|---|---|---|
| 3,090,819 | 5/1963 | Foster | 260/665 |
| 3,135,716 | 6/1964 | Uraneck et al. | 260/93.5 |
| 3,177,165 | 4/1965 | Morris et al. | 260/94.7 N |
| 3,402,162 | 9/1968 | Strobel | 260/94.2 M |

FOREIGN PATENTS OR APPLICATIONS 873,656   7/1961   United Kingdom................ 260/877

OTHER PUBLICATIONS

Chemical Abstract – Vol. 65 – 1966 (2368–2369).
Langer – "New Chelated Organolithium Polymerization Catalysts" – American Chem. Society – Division of Polymer Chem. Preprints 7(1) pp. 132–139 – 1966.

*Primary Examiner*—Paul R. Michl

[57] ABSTRACT

Treatment of conjugated diene homo and copolymers with a mixture of an organolithium compound and N,N,N′,N′-tetramethylalkylenediamine reduces inherent viscosity of the polymers.

10 Claims, No Drawings

MODIFICATION OF CONJUGATED DIENE POLYMERS BY TREATMENT WITH ORGANOLITHIUM AND N,N,N',N'-TETRAMETHYLALKYLENEDIAMINE COMPOUNDS

This invention relates to treating conjugated diene polymers in order to reduce their inherent viscosity. In another aspect the invention relates to treating such polymers to increase gel formation therein. In still another aspect, it relates to the treatment of conjugated diene polymers, to reduce their inherent viscosity and thereafter reacting the polymer with a compound that adds functional groups to the polymer macromolecule.

It is known to treat various polymers with an organolithium compound in the presence of a tertiary amine such as trimethylamine, triethylamine, dimethylcyclohexylamine, N,N-dimethylaniline, and the like, to furnish reactive sites for graft polymerization reactions. The inherent viscosity of the base polymer is changed very little, if any, as a result of the treatment.

It has now been discovered that if N,N,N',N'-tetramethylalkylenediamine is substituted for any of the aforesaid tertiary amines, and this composition is employed for treating a conjugated diene polymer, a pronounced lowering of the inherent viscosity of the gel-free portion of the polymer occurs. Branching and gel formation can also occur as a result of the treatment. The results obtained are dependent upon the relative amounts of components in the treating composition, the quantity of treating composition employed, and the time and temperature of treatment.

It is an object of my invention to provide a method for modifying the properties of conjugated diene polymers.

Another object of my invention is to provide a method for reducing the inherent viscosity of conjugated diene polymers.

Another object of my invention is to provide a method for converting linear conjugated diene polymers with a narrow molecular weight distribution into branched polymers with a wide molecular weight distribution.

Still another object of my invention is to produce polymer products of conjugated dienes ranging from very soft, gel-free materials to those containing considerable quantities of gel.

Still another object of my invention is to produce branched conjugated diene polymers with a certain inherent viscosity which have a lower cold flow than linear polymers with the same inherent viscosity.

Still further, it is an object of my invention to provide a method for adding functional groups to polymers.

Another object is to produce a novel polymer of a conjugated diene.

Other objects, advantages and features of my invention will be apparent to those skilled in the art from the following disclosure.

The polymers which can be treated according to this invention are conjugated diene homopolymers as well as random and block copolymers of conjugated dienes with monovinyl aromatic compounds, preferably containing from 8 to 20 carbon atoms per molecule. Copolymers of 2 or more conjugated dienes can also be treated according to this invention. Examples of conjugated diene polymers are polymers of conjugated diene monomers, preferably containing 4 to 8 carbon atoms per molecule, and include 1,3-butadiene, isoprene, 1,3-pentadiene, 1,3-octadiene, and the like. These polymers may be made by any known polymerization process. In this invention the treatment is not dependent upon the polymer having any particular microstructure. Thus, the polymers can contain varying amounts of cis, trans or vinyl linkages within the polymer macromolecules. Blends composed of two or more of the above polymers can also be used.

Examples of monovinyl-substituted aromatic compounds which can be copolymerized with the conjugated dienes include styrene, 3-methylstyrene, 2,4-dimethylstyrene, 3-ethylstyrene, 4-methylstyrene, 1-vinylnaphthalene, 2-vinylnaphthalene, and the like.

The N,N,N',N'-tetramethylalkylenediamine compounds employed in the treating compositions can be represented by the following formula:

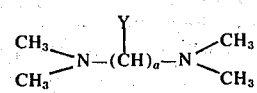

wherein $a$ is an integer from 1 to 6, inclusive, and each Y is selected from the group consisting of hydrogen and alkyl radicals containing from 1 to 3, inclusive, carbon atoms per molecule. The Y groups in the N,N,N',N'-tetramethylalkylenediamine molecules can be the same or different. Examples of these compounds include N,N,N',N'-tetramethylmethylenediamine, N,N,N',N'-tetramethylethylenediamine, N,N,N',N'-tetramethyltrimethylenediamine, N,N,N',N'-tetramethyl(1-methyl)ethylene-1,2-diamine, N,N,N',N'-tetramethylhexamethylenediamine, N,N,N',N'-tetramethyl(2-methyl)-trimethylenediamine, N,N,N',N'-tetramethyl(2,3-diethyl)-tetramethylenediamine, N,N,N',N'-tetramethyl(1,3,5-tri-n-propyl)-pentamethylenediamine, N,N,N',N'-tetramethyl(2,5-diethyl-3-isopropyl)pentamethylenediamine, and the like.

The mole ratio of the organolithium treating agent to the N,N,N',N'-tetramethylalkylenediamine should be in the range of from 1:10 to 10:1. From 20 to 200 gram millimoles of the N,N,N',N'-tetramethylalkylenediamine generally are used per 100 grams of polymer to be treated.

The organolithium compound used in this invention may be any organolithium compound capable of polymerizing conjugated dienes. This would include all organolithium compounds which contain at least one lithium-carbon bond wherein this lithium bonded carbon is bonded to at least two other atoms, preferably hydrogen or carbon atoms.

The organolithium compound which is most frequently used and preferred as a treating agent in this invention corresponds to the formula $R(Li)_x$, wherein R is a hydrocarbon radical selected from the group consisting of alkyl, cycloalkyl, alkenyl, cycloalkenyl, aryl or any combination thereof, and $x$ is an integer from 1 to 4, inclusive. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20- dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, 1,3-dilithio-4-cyclohexene, and the like. Other preferred organolithium treating agents are halogen substituted phenyllithium compounds such as 3-bromophenyllithium, lithium adducts of naphthalene, and lithium adducts of stilbene.

The amount of organolithium treating agent is that which will provide from 5 to 200, preferably from 10 to 100, gram milliequivalents of lithium per 100 grams of preformed polymer being treated. The proportions of organolithium compound and N,N,N',N'-tetramethylalkylenediamine can vary over a fairly broad range. Generally from 0.1 to 10, and preferably from 0.25 to 4, gram equivalents of lithium per gram mol of N,N,N',N'-tetramethylalkylenediamine is employed in the treating composition.

Temperatures preferable for treatment of the butadiene polymers are in the range of 25° to 200°C. preferably in the range of 50°C. to 175°C. However, temperatures outside this range can be employed if desired. The treatment is conducted at a pressure sufficient for liquid phase operation. The reaction time is dependent upon the temperature and will generally range from 2 minutes to 24 hours. A reaction time in the range of 5 minutes to 10 hours is most preferred.

Treatment of polymers according to this process is ordinarily conducted in an inert diluent such as an aliphatic, cycloaliphatic, or aromatic hydrocarbon. Examples of suitable diluents are butane, pentane, hexane, decane, cyclopentane, cyclohexane, methylcyclohexane, benzene, toluene, xylene, and ethylbenzene. Mixtures of the foregoing diluents can also be used.

Products suitable for a variety of applications can be obtained by treating conjugated diene polymers according to the present process. Low inherent viscosity polymers are particularly suitable as adhesives and adhesive ingredients and can also be employed as rubber plasticizers that can be used in rubber compounding for the production of automobile tires and the like.

In another embodiment the conjugated diene polymer can be prepared in the presence of an organolithium initiator and, without inactivation of the initiator, more of the same or different organolithium compound is added, if necessary, together with the N,N,N',N'-tetramethylalkylenediamine to effect the desired treating. Again, there is a reduction in inherent viscosity of the gel-free portion of the polymer and an increase in gel formation. High gel polymers are suitable compounds for use in adhesive formulation.

In another aspect of this invention after treatment of a polymer with the organolithium and N,N,N',N'-tetramethylethylenediamine composition, and prior to inactivation of the treating agent, a compound that is capable of replacing the lithium atoms with more stable radicals can be reacted with the treated polymer to introduce functional groups into the polymer. Such compounds, for introducing functional groups into the polymer include carbon dioxide, sulfur dioxide, oxygen, stannic chloride, silicon tetrachloride, oxirane compounds such as ethylene oxide or propylene oxide, cyclic disulfides such as 1,2-dithiocyclohexane or 1,2-dithiocyclopentane, aziridinyl phosphine oxides and sulfides such as tri(2-methyl-1-aziridinyl)phosphine oxide or tri(1-aziridinyl)phosphine sulfide, and the like. The resulting products can also be employed as adhesives or as ingredients in adhesive compositions. Such polymer products can also be used in the production of rocket propellant fuel grains by mixing the polymer with fuel ingredients and curing agents. These polymers can also be cured by reacting the functional groups with various types of coupling and/or crosslinking agents that are well known in the art.

The advantages of this invention are further illustrated by the following examples. The reactants and their proportions and other specific conditions are presented as being typical and should not be construed to limit the invention unduly.

EXAMPLE I

Cyclohexane was charged to the reactor after which it was purged with nitrogen. 1,3-Butadiene was added in an amount equal to 10 weight per cent of the cyclohexane and then 0.6 gram millimoles of butyllithium per 100 grams monomer was added. The reactor was maintained at 70°C. for 1 hour, then shortstopped with a 10 weight percent solution of 2,2'-methylene-bis(4-methyl-6-tert-butylphenol) in a mixture of equal parts by volume of isopropyl alcohol and toluene, the amount used being sufficient to provide approximately 1 part by weight of the antioxidant per 100 parts by weight of the rubber. The polymer was then separated, dried and dissolved in 10 times its weight of cyclohexane. The cyclohexane solution was treated with a mixture of 16 gram millimoles n-butyllithium and 4 gram millimoles N,N,N',N'-tetramethylethylenediamine or triethylamine per 100 grams polybutadiene. The temperature was maintained at 70°C. for 3 hours, then the reaction was terminated by the addition of a 10 weight per cent solution of 2,2'-methylenebis(4-methyl-6-tert-butylphenol) in a mixture of equal parts by volume of isopropyl alcohol and toluene, the amount used being sufficient to provide approximately 1 part by weight of the antioxidant per 100 parts by weight of the rubber. The thus treated polymer was then separated and dried. The inherent viscosity and gel content were determined as described in U.S. Pat. No. 3,278,508, column 20, before and after treatment and the results were as follows:

|  | Inherent Viscosity | | Gel, Wt. % |
| --- | --- | --- | --- |
|  | Before Treatment | After Treatment | After Treatment |
| BuLi + N,N,N',N'-tetramethylethylenediamine | 4.66 | 1.91 | 0 |
| BuLi + Triethylamine | 4.81 | 4.73 | 0 |

A significant decrease in inherent viscosity was obtained when the polybutadiene was treated with butyllithium plus N,N,N',N'-tetramethylethylenediamine but, when triethylamine was employed with butyllithium, there was only a very slight change in inherent viscosity.

EXAMPLE II

Polybutadiene was prepared by charging a reactor with 1,3-butadiene, n-heptane and n-butyllithium in a ratio of 500 milliliters of diluent and 0.75 gram millimoles of initiator per 100 grams of monomer. The reactor was maintained at 70°C. for 2 hours, then the reaction was shortstopped and polybutadiene recovered as in Example I giving a product that had an inherent viscosity of 2.58 and a 0 weight per cent gel content.

The recovered polybutadiene was dissolved in n-heptane using 100 grams of rubber per 9000 ml of solvent (6156 grams). The treating mixture of n-butyllithium and N,N,N',N'-tetramethylethylenediamine (TMDA) was added to the polymer solution and the temperature was maintained at 70°C. during treatment. Aliquots containing about 1 gram of polymer were withdrawn from each reaction mixture at intervals and recovered as in Example I. Inherent viscosity and gel were determined on each sample in the same manner as Example I. Amounts of treating materials, time of treatment, and results in inherent viscosity and gel determinations were as follows:

| Run No. | BuLi, mhr | TMDA, mhr | BuLi:TMDA Mol Ratio | Treating Time, Hours | Inh. Visc. | Gel % |
|---|---|---|---|---|---|---|
| 1 | 0 | 80 | — | 1.0 | 2.43 | 0 |
| 2 | 0 | 80 | — | 2.5 | 2.38 | 0 |
| 3 | 0 | 80 | — | 4.0 | 2.44 | 0 |
| 4 | 0 | 80 | — | 6.0 | 2.42 | 0 |
| 5 | 160 | 160 | 1:1 | 1.0 | 0.51 | 19 |
| 6 | 160 | 160 | 1:1 | 2.5 | 0.41 | 19 |
| 7 | 160 | 160 | 1:1 | 4.0 | 0.32 | 22 |
| 8 | 160 | 160 | 1:1 | 6.0 | 0.40 | 31 |
| 9 | 80 | 80 | 1:1 | 1.0 | 0.80 | 0 |
| 10 | 80 | 80 | 1:1 | 2.5 | 0.69 | 16 |
| 11 | 80 | 80 | 1:1 | 4.0 | 0.65 | 41 |
| 12 | 80 | 80 | 1:1 | 6.0 | 0.47 | 43 |
| 13 | 40 | 40 | 1:1 | 1.0 | 1.42 | 0 |
| 14 | 40 | 40 | 1:1 | 2.5 | 1.30 | 0 |
| 15 | 40 | 40 | 1:1 | 4.0 | 1.05 | 0 |
| 16 | 40 | 40 | 1:1 | 6.0 | 0.75 | 37 |
| 17 | 80 | 40 | 2:1 | 1.0 | 1.35 | 0 |
| 18 | 80 | 40 | 2:1 | 2.5 | 0.65 | 33 |
| 19 | 160 | 40 | 4:1 | 1.0 | 1.53 | 0 |
| 20 | 160 | 40 | 4:1 | 2.5 | 0.31 | 53 |
| 21 | 40 | 80 | 1:2 | 1.0 | 1.02 | 0 |
| 22 | 40 | 80 | 1:2 | 2.5 | 0.89 | 0 |
| 23 | 40 | 80 | 1:2 | 4.0 | 0.89 | 0 |
| 24 | 40 | 80 | 1:2 | 6.0 | 1.17 | 19 |
| 25 | 40 | 160 | 1:4 | 1.0 | 1.00 | 0 |
| 26 | 40 | 160 | 1:4 | 2.5 | 1.02 | 0 |
| 27 | 40 | 160 | 1:4 | 4.0 | 0.95 | 0 |
| 28 | 40 | 160 | 1:4 | 6.0 | 1.19 | 13 | mhr = gram millimoles per 100 grams rubber.

The first four runs are control runs which show that no significant change in inherent viscosity occurred when the N,N,N',N'-tetramethylethylenediamine was used alone as the treating agent. The length of treating time when the amine was used alone had no effect. The data show that a significant reduction in inherent viscosity of polybutadiene was achieved and gelfree products were produced when operating with different levels and different mol ratios of components in the treating mixture. In all cases there was a tendency toward gel formation as the treating time was increased. An increase in the level of butyllithium treating agent promoted gel formation, as evidenced by the data obtained at a 1:1 mol ratio of BuLi:amine.

As will be apparent from the above disclosure, various modifications can be made in my invention without parting from the spirit or the scope thereof.

I claim:

1. A method for reducing the inherent viscosity of a preformed polymer wherein said polymer is at least one of a polymer of at least one conjugated diene having from about 4 to 8 carbon atoms per molecule and a copolymer of said conjugated diene with a vinyl aromatic compound containing up to 20 carbon atoms per molecule, which comprises reacting said preformed polymer for at least two minutes in an inert hydrocarbon diluent at a pressure sufficient for liquid-phase operation with (1) an organolithium treating agent selected from (a) compounds represented by the formula $R(Li)_x$ wherein R is a hydrocarbon radical selected from the group consisting of alkyl, cycloalkyl, alkenyl, cycloalkenyl, aryl radicals, and combinations thereof, and x is an integer of from 1 to 4, (b) a halogen-substituted phenyllithium, or (c) a lithium adduct of naphthalene or stilbene and (2) N,N,N',N'-tetramethylalkylenediamine, wherein said N,N,N',N'-tetramethylalkylenediamine is

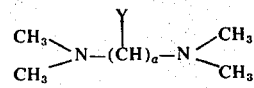

wherein $a$ is an integer from 1 to 6, inclusive, and each Y is selected from the group consisting of hydrogen and alkyl radicals containing from 1 to 3, inclusive, carbon atoms, and wherein the mole ratio of said organolithium treating agent to said N,N,N',N'-tetramethylalkylenediamine is in the range of from 1:10 to 10:1 and wherein from 20 to 200 gram millimoles of said N,N,N',N'-tetramethylalkylenediamine are used per 100 grams of said polymer.

2. The method of claim 1 wherein said preformed polymer is selected from homopolymers of said conjugated diene and copolymers at least two of said conjugated dienes.

3. The method of claim 2 wherein the temperature is maintained in the range of 25° to 200°C. and said preformed polymer is treated in the range of from 5 to 10 hours.

4. The method of claim 3 wherein said preformed polymer is a homopolymer of butadiene.

5. The method of claim 1 wherein said preformed polymer is a copolymer of butadiene and a monovinyl aromatic compound.

6. The method of claim 3 wherein said N,N,N',N'-tetramethylalkylenediamine is N,N,N',N'-tetramethylethylenediamine wherein said organolithium treating agent is n-butyllithium.

7. The method of claim 2 wherein the treated conjugated diene polymer is, prior to inactivation of said organolithium treating agent, further treated with a compound capable of replacing the lithium atoms with more stable radicals.

8. The composition prepared by the method of claim 1.

9. The composition prepared by the method of claim 2.

10. The method of treating an unsaturated polymer from the class consisting of homopolymers and copolymers of conjugated dienes and conjugated dienes with monovinyl aromatic compounds, containing a plurality of olefinic groups, which method comprises reacting the polymer at a plurality of the double bonds thereof with an organolithium treating reagent and N,N,N',N'-tetramethylalkylenediamine of the formula:

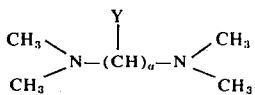

wherein $a$ is any whole number from 1–6, and each Y is H or alkyl of 1–3 carbon atoms, the ratio of organolithium treating reagent to N,N,N',N'-tetramethylalkylene diamine is 1:10 to 10:1, and wherein said treating is conducted in a hydrocarbon diluent at pressure sufficient for liquid phase operation.

* * * * *

UNITED STATES PATENT AND TRADEMARK OFFICE
CERTIFICATE OF CORRECTION

PATENT NO. : 3,931,126
DATED : January 6, 1976
INVENTOR(S) : Floyd E. Naylor

It is certified that error appears in the above–identified patent and that said Letters Patent are hereby corrected as shown below:

Column 6, claim 3, line 45, after "5" and before "to" insert -- minutes --.

Signed and Sealed this twenty-second Day of June 1976

[SEAL]

Attest:

RUTH C. MASON
Attesting Officer

C. MARSHALL DANN
Commissioner of Patents and Trademarks